Dec. 26, 1967 C. LANGEWIS 3,359,775
APPARATUS FOR FORMING CONTAINER BODIES
Filed Aug. 2, 1965 3 Sheets-Sheet 2

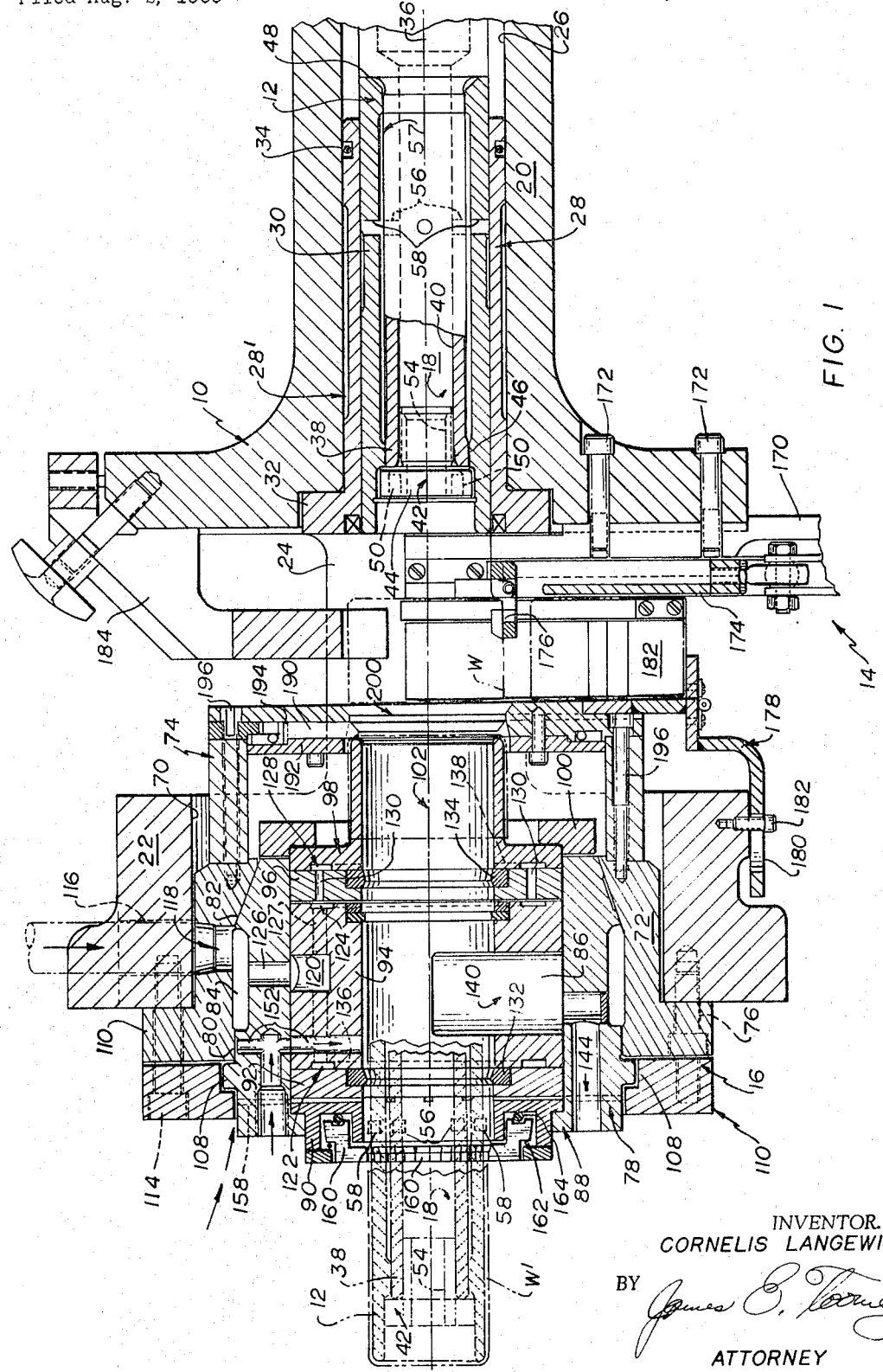

INVENTOR.
CORNELIS LANGEWIS
BY
ATTORNEY

Dec. 26, 1967 C. LANGEWIS 3,359,775
APPARATUS FOR FORMING CONTAINER BODIES
Filed Aug. 2, 1965 3 Sheets-Sheet 3
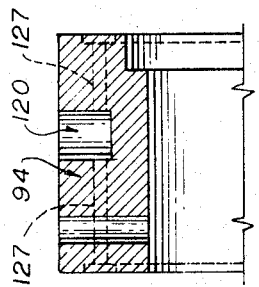
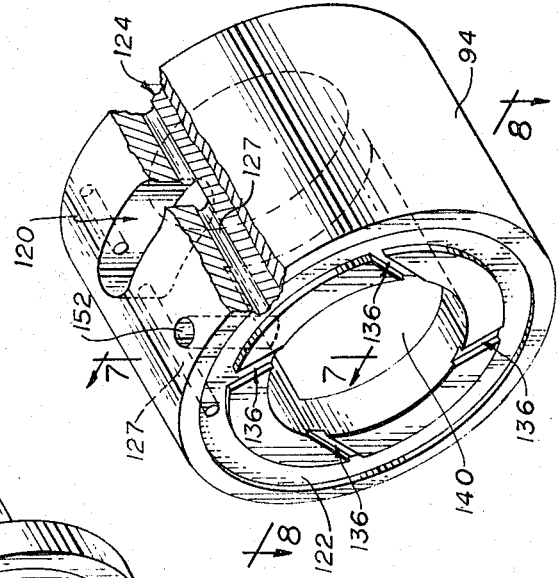
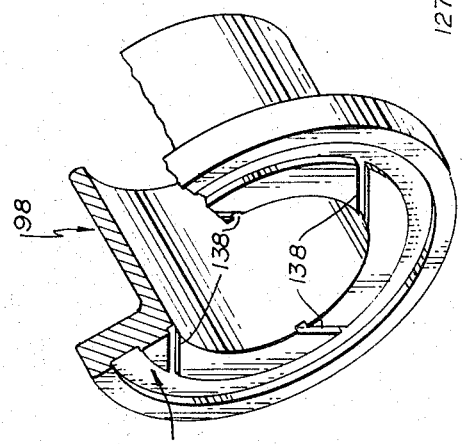
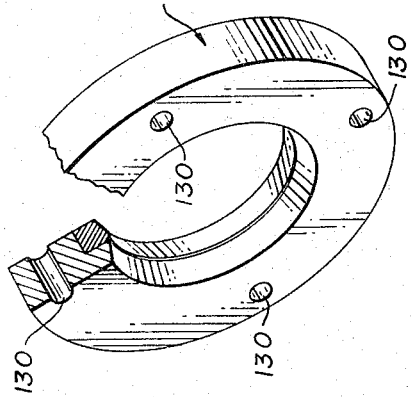
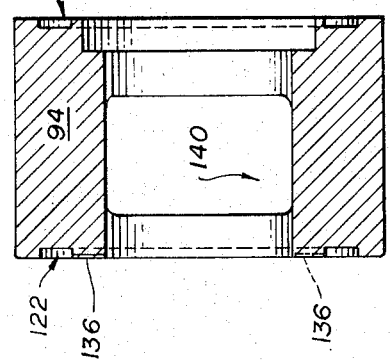
INVENTOR.
CORNELIS LANGEWIS
BY
ATTORNEY

United States Patent Office 3,359,775
Patented Dec. 26, 1967

3,359,775
APPARATUS FOR FORMING CONTAINER
BODIES
Cornelis Langewis, Walnut Creek, Calif., assignor to
Kaiser Aluminum & Chemical Corporation, Oakland,
Calif., a corporation of Delaware
Filed Aug. 2, 1965, Ser. No. 476,633
6 Claims. (Cl. 72—344)

This invention relates to an apparatus for forming cup-shaped containers. More particularly, it is concerned with providing a novel apparatus for forming elongated cup-shaped metal containers such as those used, for example, to contain food products and the like. This application also constitutes a continuation-in-part of my prior patent application Ser. No. 339,814 entitled, "Apparatus and Method," filed Jan. 23, 1964, now U.S. Patent 3,314,274 granted Apr. 18, 1967.

More specifically, this invention relates to an improved apparatus for forming cup-shaped metal containers of the type referred to from starting blanks, especially starting blanks which have the configuration of shallow metal cups, wherein novel means are employed for facilitating the stripping of a formed container body from a forming ram at the end of the working stroke of the ram.

In forming containers from cup-shaped workpieces such as in an operation wherein an ironing of the sidewall of the workpiece takes place as the forming ram advances the workpiece through one or more ironing dies, a stripper mechanism is usually employed to remove the finished container body from the forming ram at the end of the working stroke of the ram.

Unless otherwise compensated for a vacuum will normally be created between the formed workpiece and the forming ram in contact therewith during stripping of the workpiece from the ram. When such a condition exists the stripper mechanism must overcome the effect of this vacuum and the adherence of the container body to the ram in order to properly remove or free the container body from the forming ram.

In order to minimize this vacuum condition, it has been previously proposed to provide a longitudinal opening or bore within the ram which is vented to the atmosphere. Although this venting arrangement may act to minimize this vacuum condition in certain instances, it is not altogether satisfactory particularly where the forming dies and stripper mechanism are sealably mounted in a housing and high speed operations are involved. In high speed operations a minimum amount of time is given for the ingress of air into the venting system. This vacuum problem becomes further aggravated when relatively thin walled workpieces having sidewalls on the order of .005" to .008" in thickness are formed in that the vacuum condition, unless satisfactorily relieved, results in a pulling of the portions of the thin walls inwardly and a consequent deformation of the container body wall whereby the container body will be rejected for future use.

Accordingly, it is the primary purpose of the instant invention to provide an improved apparatus wherein novel means are employed to effectively relieve the vacuum condition that may occur between a container body and a forming ram during the stripping operations even under severe working conditions whereby the formed container body can be readily removed from the forming ram without damage thereto.

These and other objects of the present invention will become more apparent from a review of the following detailed description when taken in conjunction with the accompanying drawings which illustrate a preferred embodiment of the instant invention and wherein:

FIG. 1 is a longitudinal sectional view of a portion of a container forming apparatus provided with the improved ram stripping arrangement of the instant invention and with the stripping position of the ram being shown in dotted lines;

FIG. 4 is a perspective view partly broken away of an ironing die mounted within the tool holder of FIG. 3;

FIG. 5 is a perspective view partly broken away of a reverse draw die which is mounted at the inner end of the tool holder;

FIG. 6 is a perspective view partly broken away of an annular spacer disposed in the tool holder for separating certain of the dies within the tool holder from each other;

FIG. 7 is a partial sectional view generally taken along line 7—7 of FIG. 6;

FIG. 8 is a view taken along section line 8—8 of FIG. 6 and illustrates further details of the spacer block;

Figure 10:
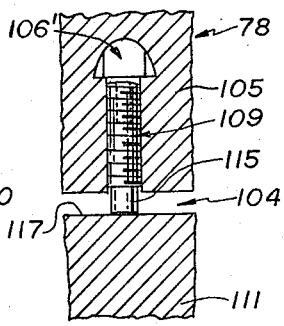
Figures 2, 9:
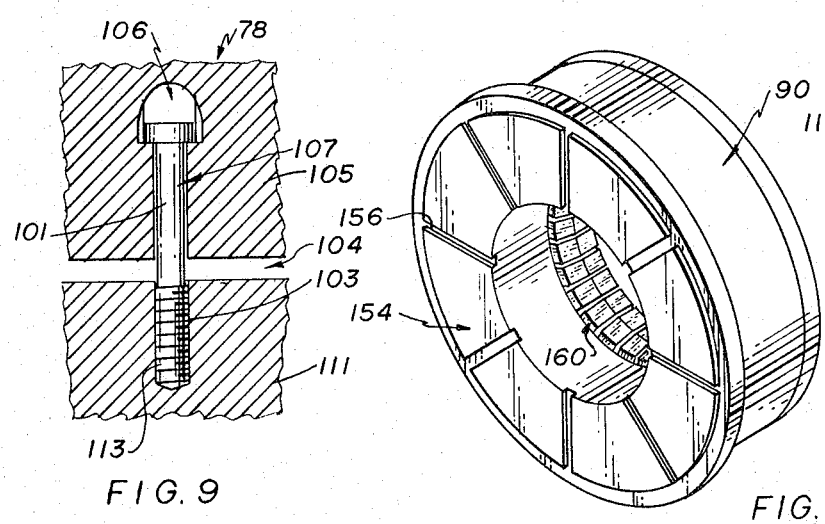
FIG. 2 is a perspective view of one end portion of the stripper mechanism that constitutes part of the tooling portion of the forming apparatus.

FIG. 9 is an enlarged sectional view taken along a chordal plane passing through a certain portion of the tool holder and illustrates details of elements for effecting expansion or contraction of the tool holder; and FIG. 10 is an enlarged sectional view taken along a chordal plane passing through another portion of the tool holder and illustrates details of other elements for effecting expansion or contraction of the tool holder.

With further reference to the drawings and in particular FIG. 1, a preferred form of apparatus that can be used to carry out the teachings of the instant invention generally comprises a barrel or housing 10 of the type disclosed in my aforesaid Patent 3,314,274. Disposed within portion 20 of housing 10 is a reciprocating forming ram assembly 12 which is adapted to be advanced through the tooling 16 suitably mounted in tool holder 22 which can comprise an extension of barrel 10. A blank feeding mechanism 14 also of the general type disclosed in my prior patent is interposed between portions 20 and 22 of the housing 10 and it operates to advance a workpiece W to a position adjacent the entry end of the tooling means 16 whereby the ram upon being suitably actuated can engage the workpiece W and advance the workpiece through the tooling 16. After passage through the tooling 16 the container will have the desired shape and become an elongated container W' of the type shown in dotted lines in FIG. 1.

A significant feature of the instant invention involves the utilization of one or more groups of air venting passageways particularly in the tooling portion of the housing 10, all to be described in further detail hereinafter, which communicate both with the atmosphere and the hollow interiors 18 and 54 of the forming ram assembly 12 at various stages in the advance and retraction of the ram relative to the tooling for bringing the hollow interiors 18 and 54 of the ram assembly 12 into communication with the atmosphere.

Portion 20 of barrel 10 includes a longitudinal bore 26. Mounted within bore 26 is a cylindrical sleeve 28. Sleeve 28 is provided at one end with a shallow recess 28' and an anchoring flange 32 whereby when the sleeve is disposed within bore 26 at the ram end 20 of housing 10 the outer periphery of the sleeve contacts the inner surface of barrel 10 and the flange 32 is disposed within a counter-bored recess at the outer end of the barrel portion 20. The sleeve 28 can be locked to barrel 10 by cap screws (not shown) passing through aligned openings in the flange 32 and the ram end 20 of barrel 10. The innermost end of the sleeve 28 includes an O-ring 34 mounted in the manner shown to provide a seal.

The forming ram assembly 12 which can have a structure similar to that of my aforesaid application comprises a removable ram sleeve 30 attached to an outer reduced end portion 38 of a hollow piston rod 36 by means of a bolt 42. The reduced end portion or stem 38 of hollow piston rod 36 is provided with a longitudinal bore 18. Stem 38 and sleeve 30 thus can be said to comprise the overall ram assembly or ram means 12. Wall 40 of bore 18 is threaded to provide for anchorage of the bolt 42 to stem 38. Bolt 42 includes a head 44 which engages an inwardly disposed annular shoulder portion 46 on ram sleeve 30. By virtue of the engagement between bolt 42 and shoulder portion 46 on sleeve 30 when bolt 42 is drawn up, the inner end of the sleeve 30 will be forced against radial shoulder 48 on piston rod 36 located adjacent the reduced end portion 38 thereof. The bolt 42 can be turned and locked securely to rod 36 by means of a spanner-type wrench insertable in standard wrench holes indicated by dotted lines 50 located within the head 44 of the bolt 42.

Bolt 42 has an inner bore 54 that communicates directly with the bore 18 in end portion or steam 38 of the piston rod 36. The surface 40 defining bore 18 intersects with the radially arranged passageways 56 projecting through the reduced end portion 38. Passageways 56 are aligned with and are in open communication with similar passageways 58 formed within ram sleeve 30.

The tool holder portion 22 of the apparatus is provided with an opening 70 for receiving the tooling generally indicated at 16. This tooling comprises an outer retainer ring 72 and a tool keeper 78 removably mounted within the ring 72. Affixed to the inner end of ring 72 is a retainer and spacer ring 74 to be subsequently described in detail. The other end of retainer ring 72 is provided with a flange which engages tool holder element 22 and is locked thereto by the bolt means 76. The tool keeper 78 includes axially spaced peripheral lands 80 and 82 at either end interconnected by an annular depression 84. These lands 80 and 82 contact the internal peripheral portions of ring 72 in the fashion illustrated in FIG. 1. Mounted within the opening or chamber 86 of the tool keeper ring 78 are the stripper mechanism 90, a first ironing die 96 and a reverse draw die 98, a second ironing die 92 and a spacer block 94. The stripper mechanism can be of the general type disclosed in the copending application S.N. 276,632 of Arthur D. Smith et al. filed Apr. 29, 1963. The aforesaid die elements, spacer block and stripper mechanism are held in place in chamber 86 by means of adapter plate 100 fastened by suitable means (not shown) to one end of tool keeper 78 and the flange 88 at the other end of the tool keeper. The interior hollowed out portions of dies 92, 96 and 98, block 94 and stripper mechanism 90 define a common passage 102 through the tooling 16.

Figure 3:
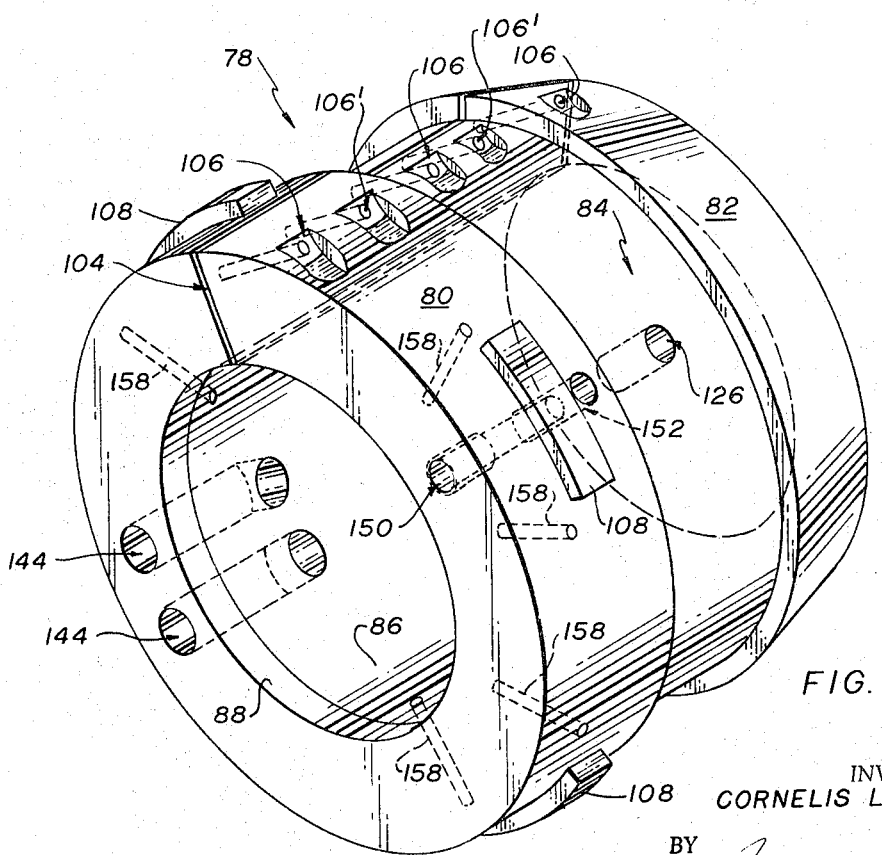
FIG. 3 is a perspective view of a removable tool holder used to mount the dies and stripper mechanism in a particular manner within the tooling section of the apparatus.

The tool keeper 78 can be advantageously split at the point 104 along its periphery as shown in FIG. 3 and the opposing split ends 105 and 111 can be drawn towards or away from each other by a series of fastening screws 107 and spreader bolts 109, as shown in detail in FIGS. 9 and 10. The screws 107 and bolts 109 are disposed in openings generally indicated at 106 and 106′, respectively, whereby the outer peripheral portion of keeper 78 can be, as hereinafter set forth, expanded or contracted within selected limits. The screw 107 includes a non-threaded shank portion 101 disposed between the head and the threaded portion 113. The peripheral end 111 of the tool keeper 78 includes an inwardly extending opening 103 that constitutes an axial extension of the opening 106. This extension 103 is threaded for engaging the threaded end portion 113 of the screw 107. When the screw 107 is forced through the openings 106 and 103 by a suitable tool, the threaded portion 113 thereof threadably engages the opening 103.

The spreader bolt 109 (see FIG. 10), however, threadably engages the threads of the opening 106′ disposed within the peripheral end 105 such that the inner reduced end of the bolt 109 provides an abutment 115, the end face of which is in opposed mating contact with the end face 117 of the other split end 111. The exposed or upper end of the bolt 109 includes an inwardly extending recess which is adapted to receive a suitable turning tool.

In effecting expansion or contraction of the tool keeper 78, the operator can selectively apply the proper tools as aforedescribed to the upper ends of the screws and bolts 107 and 109. In other words, loosening of the screws 107, disposed within their openings 106, enables the bolts 109 to be advanced inwardly so that their abutments 115 exert a force against the contacted end face 117 to effect an enlargement of the opening or slot 104 extending between the peripheral ends 105 and 111 of the keeper 78. Similarly, loosening of the bolts 109 relative to the screws 107 enables relative movement of the threaded portions 113 of the bolts 107 from their boxes 103. Any suitable number of screws 107 and 109 can be used to effect controlled expansion or contraction of the split keeper 78.

It is therefore evident that the expandable feature of the tool keeper not only facilitates insertion and removal of the various elements adapted to be mounted therein but also permits a positive locking and sealing of these elements in place while compensating for any tolerances that exist in these elements as a result of manufacture, all of which is important to maintain alignment between the various die elements of the tooling 16.

As particularly indicated in FIG. 3 the outer peripheral portion 80 of tool keeper 78 is provided with a series of lugs 108 that advantageously function to locate the axial position of the tool keeper 78 relative to the outer ring 72 when the tool keeper 78 is secured to the outer ring 72 and tool holder portion 22 of the housing 10 by the adapter 110 and bolt means 114.

In a further advantageous embodiment of the invention, means are provided for supplying coolant to a workpiece W as it passes through the tool pack 16 and for venting hollow bores 18 and 54 of the ram assembly to the atmosphere by way of suitable passageways to be hereinafter described. It is also evident that as the ram assembly 12 with the workpiece W moves through the tool pack 16 the forward end of the opening of the ram is covered by the workpiece so that venting of bores 18 and 54 to the atmosphere must be effected through the medium of the radial passageways 56 and 58.

Coolant is supplied to the tool pack as follows: An opening 116 in tool pack holder 22 is connected to a suitable source of coolant. Opening 116 communicates with radial opening 118 in the outer ring 72. Opening 118 leads to annular chamber 84 and a take-off opening 126 leads from chamber 84 to suitably shaped well 120 in spacer block 94.

A pair of circumferentially spaced and longitudinally extending passageways 127 best shown in FIGS. 1, 6 and 7 lead away from well 120 and open into annular recessed portions 122 and 124 disposed in the faces of spacer block 94. The reverse draw die 98 also includes an annular recessed portion 128 in the rear face thereof. This recessed portion 128 is in open communication and interconnected with annular recess 124 in spacer block 94 by means of a series of longitudinal passageways 130 (four of which are shown) that extend axially through the first ironing die 96. In order to direct the flow of coolant from the annular recess portion 128 into the first ironing die orifice 134, a series of chordal-like grooves 138 are provided on the rear face of the reverse draw die 98. One end of a groove 138 terminates at the recessed portion 128 and the other end terminates in common passage 102. These passages direct the coolant in a vortex fashion about the ram and container body as it proceeds into die 96. A similar series of chordal-like grooves 136 extent inwardly from the annular recessed portion 122 in the end face of the spacer 94 to the internal periphery thereof to direct the flow of coolant again in a vortex fashion adjacent the second ironing die orifice 132. Excess coolant is then exited from the die pack 16 between the ironing die orifices 132 and 134 by means of an enlarged transverse opening 140 shown in FIGS. 1 and 6–8 that is provided in the spacer element 94. The enlarged transverse opening 140 is in turn connected to a pair of circumferentially spaced exhaust passageways 144 of right angular shape that are formed within the body of the tool keeper 78. The interconnecting passageways through the die end 22 of the apparatus, the outer ring 72, tool keeper 78 and the tool elements 94, 96 and 98 allow a free flow of the coolant from the inlet conduit 116 to the exhaust passageways 144 as aforedescribed.

At this point note may be taken of the serious problem encountered by the vacuum condition that can occur at the time of stripping of the container body from the ram assembly 12 as the container body is slid along ram sleeve 30 by the stripper fingers of stripper mechanism 90 unless compensated for. When the stripping takes place the interior of the container body W' forms in effect a progressively increasing hollow chamber, which communicates with chambers 18 and 54 in the ram assembly. This container body interior has to be filled with air. If air is not passed into the interior of the container body W' at this time, a differential in air pressure will exist between the inside and outside of the container body W' and an implosion of the sidewall of the container body W' can occur. In the instant apparatus the problem of getting air into the interior of the ram assembly is particularly acute not only because of the substantially sealed condition of the tool pack 16 relative to housing 10 and required for die alignment purposes but also due to the curtains of coolant injected into passageway 102 through openings 136 and 138. The coolant curtains in effect tend to seal off the interior of passage 102 between dies 92 and 96 from the atmosphere.

In order to provide ingress of atmospheric air to the tool pack 16 therefor, a unique interconnecting passageway system is provided. This passageway system opens common passageway 102 between the die orifices 132 and 134 and between the stripper mechanism 90 and the die orifice 132 to the atmosphere and, because of the particular disposition of the passageways in the system, maintain an atmospherically open condition in passage 102 even when a workpiece covers the forward end of the ram assembly 12. This additional passageway system includes a right angle or first passageway 150 provided in the tool keeper ring 78 and interconnected with a radial opening 152 that is common to the keeper ring 78 and the spacer element 94 in the manner illustrated in FIGS. 1, 3 and 6. These interconnected passageways 150 and 152 located at a point remote from the stripper mechanism 90 and the exit end of the ironing die 92 and extending to the common opening 102 maintain passageway 102 at simple atmosphere pressure and assure that atmospheric air will always pass into the hollow interiors 18 and 54 of the ram assembly 12 through the passageways 56 and 58 during the return stroke of the ram and during a portion of the time involved in stripping the container from the ram. By this particular arrangement no special means are required for flooding the bores 18 and 54 with pulses of air to ensure release of the container body W' when it engages the fingers of the stripper mechanism 90. By eliminating any such special means wherein reliance is had on timing mechanisms, etc. the problems which might be encountered by use of such special means are also avoided.

Similarly, when the forming ram assembly 12 passes between the stripping mechanism 90 and the last ironing die orifice 132 on its forward and return strokes, the hollow interiors 18 and 54 of the forming ram assembly 12 are also brought into contact with the atmosphere. For this purpose, the inner axial end face 154 of the stripper mechanism 90 of FIG. 2 can also be advantageously provided with a series of equally spaced radial passageways 156 extending between the inner and outer peripheral surfaces of the body of the stripper mechanism 90. These grooves 156 at their outer ends are interconnected with a series of generally radial passageways 158 disposed within the flange 80 of the tool holder ring 78. These openings 158, best shown in FIG. 3, and intermediate the stripper mechanism 90 and die 92, extend radially between the inner and outer peripheral surfaces of the tool keeper 78. In the event that the radial passageways 156 and 158 are not exactly aligned when the various parts of the tool pack 16 are assembled together there still will be sufficient clearance between the outer periphery of the stripper mechanism 90 and the internal periphery of the tool keeper 78 to assure open communication therebetween. The outer terminal ends of openings 158 communicate to the atmosphere surrounding the barrel 10 by virtue of the annular clearance space that is allowed between the oppositely facing annular surfaces of the tool keeper 78 and retainer ring or clamp 110. These openings 156 and 158 provide additional communication between the atmosphere and bore 18 in the ram assembly are added insurance that atmospheric conditions exist in the bores 18 and 54 of the ram assembly 12 at the time the finished container body W' is being stripped from the ram. Thus, any vacuum condition that might possibly exist during stripping of the workpiece is relieved in a simple yet positive fashion.

Although the stripper mechanism 90 is described in detail in the aforementioned patent application of Arthur D. Smith et al., S.N. 276,632, filed Apr. 29, 1963, it may be noted here that it generally comprises a plurality of circumferentially arranged and individually biased finger elements 160. These fingers 160 are resiliently biased in a plurality of directions by spaced O-rings 162 and 164.

Inasmuch as the means for feeding a shallow cup-shaped workpiece W to and orienting the workpiece relative to the advancing ram 12 and reverse draw die 98 is disclosed in detail in my aforementioned Patent 3,314,274, it is sufficient to note at this point that feeding mechanism 14 may generally comprise a magazine 178 located adjacent a frame member 170 and a cam actuated slide 174 mounted on the frame member 170. The frame member 170 is affixed to the barrel 10 by appropriate bolt means 172. The forward end of the slide 174 is adapted to cooperate with the magazine 178 for the purpose of moving in timed relation to the advancing ram a shallow cup-shaped workpiece W into alignment with the ram 12 and reverse draw die 98 prior to the ram's advancement into the die pack 16. Magazine 178 can comprise a series of guide members 180 affixed by cap screws 182 to the head end 22 of the apparatus. The forward end of the slide 174 includes a resiliently mounted finger 176 that functions to feed the bottommost workpiece W in the magazine into alignment with the ram assembly 12 upon proper advancement of the slide 174.

A workpiece guide means 200, the details of which are also disclosed in my prior Patent 3,314,274, can also be affixed to holder 72 and adjacent the entry end of reverse draw die 98 by means of ring 74 and bolts 196. The purpose of this guide means 200 is to ensure proper entry of all portions of the workpiece into the reverse draw die 98.

An advantageous embodiment of the invention has been shown and described. It will be obvious to those skilled in the art that various changes and modifications may be made therein without departing from the spirit and scope thereof as set forth in the appended claims, wherein:

What is claimed is:

1. In an apparatus for forming container bodies comprised of a housing, forming die means, means for substantially sealably locking said die means in said housing, a hollow ram means mounted in said housing for advancing a workpiece through said die means and thereby forming said workpiece into a container body, stripper means mounted on said housing adjacent the exit end of said die means for disengaging a finally formed container body from the ram means at the end of the working stroke of said ram means and means for connecting the interior of said hollow ram means with the atmosphere during the disengagement of a container body from said ram means and while a portion of said ram means is disposed in said means for substantially sealably locking said die means in said housing to prevent the drawing of a vacuum in the interior of said container body, said last mentioned connecting means comprising at least one air vent passage means disposed at a preselected location in said sealably locking means, said air vent passage means being fully open to the atmosphere at all times and the interior of said sealably locking means and communicable with the interior of said ram means at least during a portion of time involved in disengaging the container body from said ram means.

2. An apparatus as set forth in claim 1 wherein the side wall of the ram means includes ports open to the interior of the ram means and alignable with the air vent passage means in said sealably locking means.

3. An apparatus as set forth in claim 1 including a second air vent passage means open to the atmosphere at all times and disposed in said sealably locking means intermediate said stripper means and the exit end of said die means and communicable with the interior of said ram means during a part of the time said container body is disengaged from said ram means.

4. In an apparatus for forming container bodies, the combination of a housing, forming die means, means sealably locking said die means in said housing, a hollow forming ram means mounted in said housing for passing a workpiece through said die means and for forming said workpiece into a cup-shaped body, means for flooding said die means with coolant, stripper means mounted on said housing adjacent the exit end of said forming die means for removing a finally formed container body from said ram means after said ram means has completed its forward stroke, and means for assisting the stripper means in the removal of the formed container body from the ram means, said last mentioned assisting means comprising a first air vent means located in said sealably locking means at a point intermediate said stripper means and the exit end of said die means, said first air vent means being open to the atmosphere at all times and communicating with the interior of the ram means during a part of the time required to remove the container body from the ram means, a second air vent means located in said sealably locking means at a point remote from the stripper means and the exit end of the die means and open to atmosphere at all times, said second vent means communicating with the interior of the ram means during another part of the time required to remove the container body from the ram means by said stripper means.

5. An apparatus as set forth in claim 4 wherein said means for flooding said die means with coolant comprises a first and second coolant flooding means and said second air vent means being disposed intermediate said first and second coolant flooding means.

6. An apparatus as set forth in claim 4 wherein the side wall of said ram means includes ports open to the interior of the ram means and alignable with the first and second air vent means in said sealably locking means.

References Cited

UNITED STATES PATENTS

| 1,295,430 | 2/1919 | Carlson | 72—344 |
| 2,261,060 | 10/1941 | Giesler | 72—346 |
| 3,167,044 | 1/1965 | Henrickson | 72—342 |

RICHARD J. HERBST, *Primary Examiner.*